June 28, 1955    L. E. BROBERG ET AL    2,711,834
CUTTER TEETH
Filed Sept. 25, 1953

INVENTORS:
Leonard E. Broberg
Erwin G. Dueringer
BY Andrus & Seeales
ATTORNEYS.

United States Patent Office 2,711,834
Patented June 28, 1955

2,711,834

CUTTER TEETH

Leonard E. Broberg and Erwin G. Dueringer, Milwaukee, Wis., assignors to A. O. Smith Corporation, Milwaukee, Wis., a corporation of New York Application September 25, 1953, Serial No. 382,434

9 Claims. (Cl. 214—17)

This invention relates to cutter teeth and more particularly to cutter teeth employed to undercut stored material, such as silage, contained in a storage vessel.

This application is a continuation in part of the application Serial No. 326,516 entitled "Cutter Teeth" and filed December 17, 1952, and now abandoned by the same applicants.

An object of the present invention is to provide a cutter tooth to be attached to an endless chain which will penetrate and tear apart extremely hard packed silage.

Another object of the invention is to provide an arrangement of cutter teeth on an endless chain whereby a clean path is cut through the stored material without any remaining ridges or protuberances.

Still another object is to provide an arrangement of cutter teeth on an endless chain carried by a sweep arm cutter which substantially reduces the pressure of the stored material on the sweep arm.

Another object is to provide an arrangement of cutter teeth on an endless chain carried by a rotating sweep arm cutter which will prevent the arm from rising as the stored material is cut by the teeth.

The present invention is directed to a novel cutter tooth for use in undercutting stored material, such as silage, in a storage vessel or silo and the arrangement thereof on an endless chain which is carried by a rotating cutter arm. The chain travels about a pair of sprockets carried by the arm which is rotatably secured at the center of the silo and adapted to sweep around the interior of the silo.

A number of the teeth are welded to each of a plurality of vertical bars which in turn are attached to the links of the chain. The arrangement of the teeth on the bars is such that some of the teeth are disposed in a horizontal plane and extend outwardly from the bars, other teeth extend upwardly from the bars, while others extend upwardly and inwardly over the cutter arm. By this arrangement of teeth the silage is cut ahead of the rotating cutter arm and also above the same so as to decrease the pressure of the silage on the arm and prevent the resulting slow down of the arm due to the excessive pressure of the silage.

Each individual tooth is provided with a large diamond-shaped head with the outer tip of the head being curved toward the direction of travel of the chain. The head tapers down to a thin body portion having a sharp leading edge portion which reduces the resistance of the tooth as it passes through the silage. As the teeth move with the travel of the chain, the pointed tip of the diamond head penetrates the silage and the enlarged diamond head rips or shreds the silage. The action of the teeth is one of tearing or clawing rather than actual cutting of the silage.

Other objects and advantages of the invention will appear in the course of the following description of the drawing in which.

Figure 1:
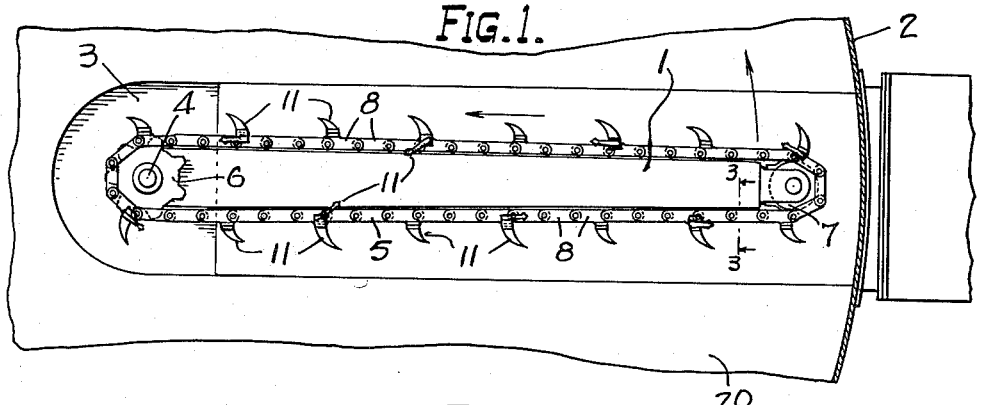
Figure 1 is a fragmentary top plan view of the cutter mechanism.
Figure 2:
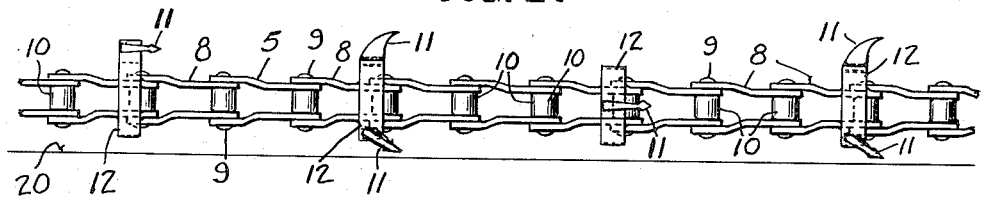
Fig. 2 is an enlarged fragmentary side elevation of the cutter chain and attached teeth.

Referring to the drawings there is shown a sweep cutter arm 1 to be employed to rotate within a storage vessel or silo 2 and undercut the material, such as silage, contained therein. The cut silage is swept into a radial extending trough 3 at the center of the silo 2 and a suitable conveyor unit, not shown, operates within the trough 3 to convey the cut silage to the exterior of the silo.

The inner end of cutter arm 1 is secured to a central drive shaft 4 which is suitably journaled within trough 3 at the center of the silo. Shaft 4 is given rotary motion by any convenient drive system and the rotation of shaft 4 causes the cutter arm to correspondingly rotate and sweep around the silo.

An endless roller chain 5 is carried by cutter arm 1 and supported between sprockets 6 and 7. Sprocket 6 is suitably secured to shaft 4 and serves to drive chain 5 as shaft 4 rotates. Sprocket 7 is rotatably secured between the outer bifurcated ends of arm 1 and serves to support and guide the outer end of the chain.

Roller chain 5, shown for illustrative purposes only, is a conventional type of chain having a plurality of pairs of offset links 8 which are connected at their extremities to adjacent pairs by rivets 9 to form the endless chain. The links of each pair are spaced apart by rollers 10 which are adapted to ride against the teeth of sprockets 6 and 7.

A plurality of cutter teeth 11 are connected to the links of chain 5 and are adapted to penetrate the silage and shred the same as the chain travels about sprockets 6 and 7.

The teeth 11 are connected to the links 8 of chain 5 by a series of connecting bars 12 which are secured to every third pair of links. Every third pair of links 8 is formed with outwardly extending flanges 13 with the flange of the upper link of the pair facing upwardly and the flange of the lower link facing downwardly. The bars 12 are welded or bolted flatwise to the outer surface of flanges 13 adjacent the leading end (in the direction of chain travel) of the links.

A vertically disposed connecting bar 12 is secured flatwise to the outer surfaces of the flanges 13 adjacent the leading end of links 8.

The individual teeth 11 are welded endwise to the bars 12. A number of the teeth 11 extend outwardly from bars 12 in a substantial horizontal plane while other teeth 11 extend upwardly in a substantially vertical plane from upper flange 14 of bars 12 and others extend upwardly and inwardly from the flanges 14 of bars 12 to a position over the cutter chain 5.

Figures 4, 5:
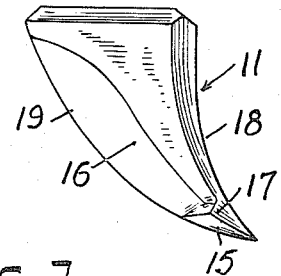
Fig. 4 is a side elevation of one of the teeth.
Fig. 5 is a front elevation of the tooth shown in Fig. 4.
Figure 6:
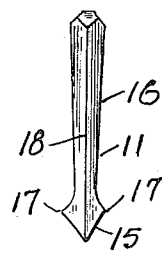
Fig. 6 is a bottom plan view of the tooth shown in Fig. 4.

Each individual horizontally extending tooth 11, as best seen in Figs. 4, 5, and 6, is constructed with a large diamond-shaped head 15 which tapers into a generally thin body 16.

The tooth 11 is curved in the direction in which it travels on chain 5 and the head 15 terminates in a sharply pointed tip. The sharp tip of head 15 is adapted to initially penetrate the silage and the lateral projections 17 or ears of the enlarged diamond head serve to rip or tear the silage apart as the head passes therethrough.

The leading edge 18 of the body 16 is tapered to a sharp generally knife-like contour, and the generally arcuate trailing edge 19 of body 16 is also tapered, providing a thin streamlined configuration to minimize the resistance of the body 16 as the tooth drives through the silage.

Figure 7:
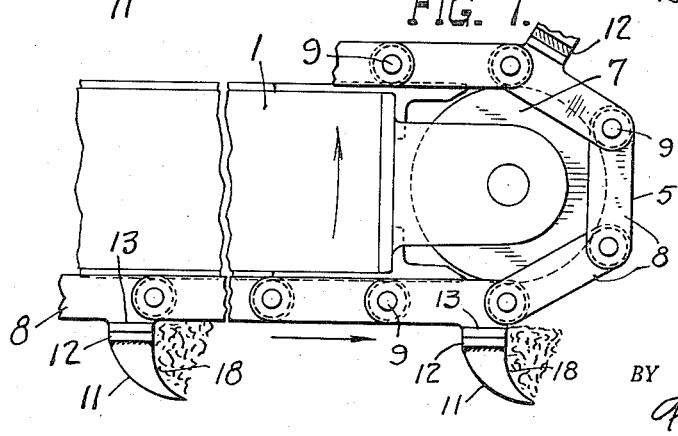
Fig. 7 is an enlarged fragmentary view of Figure 1 showing the silage dislodging action as the chain passes around the sprocket.

By attaching the bars 12 to the forward or leading portion of the links, the silage lodged between the leading edge 18 of the horizontally disposed teeth 11 and the links 8 will be freed as the chain 5 passes around the sprockets. As seen in Fig. 7, the silage tends to lodge within the space between the leading edge 18 of the horizontal teeth and the preceding link 8. On approaching the sprockets, the preceding link will begin to turn thereby enlarging the space between the leading edge of the teeth and the link and freeing the silage lodged therein.

Figure 3:
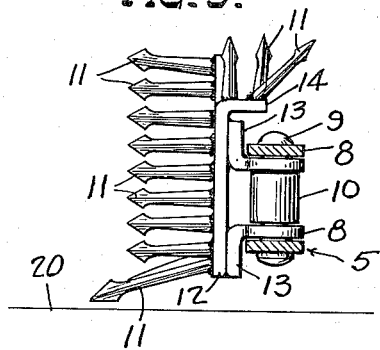
Fig. 3 is a transverse section taken along line 3—3 of Figure 1.

To reduce the tendency for the rotating cutter arm to rise as teeth 11 rip through the silage, the lowermost of the horizontal teeth, as shown in Fig. 3, may be positioned on the respective bars 12 so that they diverge downwardly at a slight angle toward the foundation 20 of the silo. This divergence of the lower teeth prevents the arm 1 from lifting during the cutting operation.

As the broad or flat surface of the horizontal teeth is subjected to the weight of the mass of silage, it is desirable to construct these teeth with a comparatively short length, as seen in Fig. 3, so that the weight of the silage on the teeth will not tend to bend the same downwardly. However, the lowermost horizontal teeth are constructed with a considerably greater length than the remainder of the horizontal teeth. The longer lowermost horizontal teeth serve as conveyors or carriers and move the cut silage into the conveyor trough 3, and their longer length is desirable in order to accomplish this purpose. The lowermost horizontal teeth are also twisted throughout their length in order that the pointed tip of head 15 is disposed at a level approximately even with that of the lower extremity of the connecting bars 12. This twist can be best seen in Fig. 3. This feature prevents the silage from packing on the foundation 20 beneath the path of travel of the bars 12.

The upwardly extending teeth, namely the upright and diagonally extending teeth, are provided with a slightly different shape than the horizontal teeth. The lateral projections of the diamond shaped head are considerably smaller on the upwardly extending teeth than those of the horizontal teeth. The upwardly extending teeth are useful primarily when starting the unloader after the silage has packed down on top of the cutter arm and are designed to penetrate into silage above chain 5 and loosen the same so that the cutter arm will be free to rotate. The upwardly extending teeth will penetrate into the silage more easily and perform their desired function if the lateral projections 17 of the diamond shaped head are not as pronounced as that of the projections 17 of the horizontal teeth which are used primarily for dislodging the silage.

The number of teeth welded to any one bar 12 depends on the particular operation involved, but it has been found that in cutting silage an upwardly extending tooth should be attached to every alternate bar 12. In addition, a longer lowermost horizontal tooth is employed on each alternate bar that carries an upwardly extending tooth. Every intermediate bar carries a small horizontal tooth. It is not desirable to employ a small horizontal tooth and a long horizontal conveying tooth on the same bar 12 for silage tends to lodge between the two horizontal teeth regardless of the space between them. Thus, only one horizontal tooth should be employed on a bar 12.

The horizontally disposed teeth are disposed on the various bars so that the swath cut by any one tooth will substantially adjoin or slightly overlap the swath cut by adjacent teeth. By this arrangement there will be no hard packed ridges produced between the swathes which might tend to obstruct the movement of the cutter arm through the silage.

The action of the teeth is one of clawing or ripping and dislodging rather than cutting. The head 15, being bent in the direction of movement and being tapered to a sharp tip, facilitates penetration of the tooth into the silage. The large diamond shape of the head provides a maximum ripping surface once the head has entered the silage and serves to effectively tear or shred the silage from the hard packed mass. The thin body portion with tapered leading and trailing edge portions provides minimum resistance as the tooth drives through the silage.

The present invention provides a cutter tooth arrangement on an endless chain which will penetrate and rip apart the hardest packed silage without the sweep arm jamming or otherwise clogging in the silage mass. The arrangement of teeth effectively reduces the downward pressure of the silage on the cutter arm and enables the teeth to cut a wide clean swath through the silage. The teeth are so positioned on the chain that silage will not lodge between the teeth nor between the teeth and other parts of the chain, and thus the effectiveness of the teeth are maintained at all times.

Various modes of carrying out the invention may be employed within the scope of the accompanying claims which particularly point out and distinctly set forth the subject matter regarded as the invention.

We claim:

1. A cutter tooth attached to a moving cutting apparatus employed to dislodge silage and comprising a body having a generally thin configuration in the direction of travel of said tooth and being provided with a substantially sharp leading edge portion to decrease the frictional resistance of the tooth as the same moves through the silage, a tapered tip extending outwardly from said body portion and bent in the direction of travel of said tooth and adapted to initially penetrate the silage, and a pair of generally pointed ears extending laterally from the upper portion of said body adjacent said tip and serving to rip a swath through the silage as the tooth moves therethrough.

2. A tooth attached to a moving cutting apparatus employed to undercut silage, said tooth comprising a body having a substantially flat configuration and being tapered in the direction of travel of said tooth to provide a generally knife-like leading edge, a head extending outwardly from the body and including a pointed tip bent in the direction of travel of said tooth, a pair of generally pointed projections extending laterally from the head on opposite sides thereof and tapering toward said tip, said tip being adapted to initially penetrate the silage and said projections serving to rip the silage apart as the tooth moves therethrough, and a generally arcuate trailing edge portion extending from said body to said tip to facilitate removal of said tooth from the silage.

3. An apparatus for dislodging silage comprising an endless chain adapted to travel within said silage along the foundation of a storage structure, and a plurality of teeth secured to said chain at spaced intervals thereon with a portion of said teeth extending outwardly from said chain in a series of substantially horizontal planes to penetrate the silage and disloge the same, a second portion of said teeth extending outwardly from said chain in a plane beneath said series of horizontal planes and having a substantially greater length than said first named portion of teeth, said second portion of teeth serving primarily to convey the dislodged silage along the foundation.

4. An apparatus for dislodging silage comprising an endless chain adapted to travel within silage contained in a storage structure, a plurality of connecting members attached to said chain at spaced intervals thereon, and a plurality of teeth secured to said connecting members with a portion of said teeth extending outwardly from said members in a series of substantially horizontal planes, the teeth in the upper horizontal planes being substantially shorter than the teeth in the lowermost of said horizontal planes to prevent the teeth in the upper planes from bending due to the weight of the silage thereon, a second portion of said teeth extending upwardly from said members and serving to prevent the silage from packing down on said chain, each of said teeth comprising a body having a generally thin configuration in the direction of travel of said tooth and being provided with a substantially sharp leading edge portion to decrease the frictional resistance of the tooth as the same moves through the silage, each of said teeth having a tapered tip extending outwardly from said body portion and bent in the direction of travel of said tooth and adapted to initially penetrate the silage, and having a pair of generally pointed ears extending laterally outward from the upper portion of said body adjacent said tip and serving to rip a swath through the silage as the tooth moves therethough.

5. An apparatus for undercutting silage, comprising an endless chain adapted to travel within said silage, a plurality of connecting members attached to said chain at spaced intervals thereon, and a plurality of teeth secured to said connecting members with every alternate connecting member carrying a horizontally disposed tooth extending outwardly from said member and every intermediate connecting member carrying a generally vertical tooth extending upwardly therefrom, said horizontal teeth comprising a generally flat body portion having a substantially sharp leading edge portion in the direction of travel of said teeth and an enlarged generally diamond-shaped head extending outwardly from said body section and formed with a pointed tip, said vertical teeth comprising a generally flat body portion having a substantially sharp leading edge portion in the direction of travel of said tooth and a generally pointed tip facing in a direction of travel of said tooth.

6. An apparatus for cutting silage, comprising an endless chain adapted to travel within said silage, a plurality of connecting members attached to said chain at spaced intervals thereon, and a plurality of teeth secured to said connecting members with a number of said connecting members carrying a horizontally disposed tooth extending outwardly from said member and the other of said connecting members carrying both a generally vertical tooth extending upwardly therefrom and a generally horizontal tooth extending outwardly and downwardly adjacent the lower extremity of said member, said teeth comprising a generally flat body section having a substantially sharp leading edge portion in the direction of travel of said tooth and a head extending outwardly from said body section and formed with a pointed tip and having generally pointed outwardly extending lateral projections thereon, said tip being pointed in the direction of travel of said teeth and adapted to initially penetrate the silage and dislodge the same.

7. In an apparatus for dislodging silage, an endless chain adapted to travel within said silage, a connecting member attached to said chain, and a tooth secured to the lower portion of said connecting member and extending outwardly and slightly downwardly therefrom to prevent the chain from rising during its travel, said tooth comprising a generally thin body section having a sharp leading edge in the direction of chain travel and an enlarged generally diamond-shaped head extending outwardly from said body section and formed with a pointed tip facing generally in the direction of chain travel, said tip initially penetrating the silage and said enlarged head dislodging the same as the tooth moves therethrough, said tooth being disposed with said pointed tip in a plane beneath the lowermost extremity of said connecting members to prevent silage from lodging beneath said members.

8. In an apparatus for cutting silage stored in a storage structure, an arm rotatably secured to the foundation of said structure and adapted to rotate within said structure, an endless chain carried by said arm and adapted to travel thereon, said chain comprising a plurality of links pivotally connected together at their end portions, a plurality of connecting members attached to the leading end portion of said links in the direction of chain travel, and a plurality of teeth secured to said connecting members and extending outwardly therefrom to penetrate the silage and dislodge the same, said teeth having a generally thin body configuration in the direction of chain travel and being bent in the direction of chain travel to terminate in a generally pointed tip and provide a space between the leading edge portion of the teeth and the preceding link, said silage tending to lodge within said space during travel of the chain and being dislodged from said space as said preceding link pivots when approaching the end portion of the arm.

9. An apparatus for undercutting silage, comprising an endless chain adapted to travel within said silage, a plurality of connecting members attached to said chain at spaced intervals thereon, and a plurality of teeth secured to said connecting members with every alternate connecting member carrying a horizontally disposed tooth extending outwardly from said member to dislodge the silage and every intermediate connecting member carrying a generally vertical tooth extending upwardly therefrom over said chain to prevent the silage from packing down on said chain and carrying a conveyor tooth to convey the dislodged silage to a collection location, said conveyor tooth extending angularly downward from the lower portion of said member in a plane beneath the horizontally disposed teeth and having a substantially greater length than said horizontally disposed teeth.

References Cited in the file of this patent

UNITED STATES PATENTS

| | | |
|---|---|---|
| 1,160,843 | Charlton | Nov. 16, 1915 |
| 1,510,490 | Muehlhauser | Oct. 7, 1924 |